(12) United States Patent
Shetty et al.

(10) Patent No.: US 6,735,578 B2
(45) Date of Patent: May 11, 2004

(54) INDEXING OF KNOWLEDGE BASE IN MULTILAYER SELF-ORGANIZING MAPS WITH HESSIAN AND PERTURBATION INDUCED FAST LEARNING

(75) Inventors: Ravindra K. Shetty, Bangalore (IN); Venkatesan Thyagarajan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 339 days.

(21) Appl. No.: 09/852,577

(22) Filed: May 10, 2001

(65) Prior Publication Data

US 2003/0093395 A1 May 15, 2003

(51) Int. Cl.$^7$ ............................. G06F 15/18; G06F 7/00
(52) U.S. Cl. ............................. 706/16; 706/14; 706/39; 707/3; 707/5
(58) Field of Search ............................. 706/16, 14, 39; 707/3, 5

(56) References Cited

U.S. PATENT DOCUMENTS

| | | | | |
|---|---|---|---|---|
| 5,619,709 | A | * | 4/1997 | Caid et al. .................. 715/532 |
| 5,974,412 | A | * | 10/1999 | Hazlehurst et al. ............ 707/3 |
| 6,226,408 | B1 | * | 5/2001 | Sirosh ........................ 382/224 |
| 6,625,585 | B1 | * | 9/2003 | MacCuish et al. ............ 706/10 |
| 2002/0069218 | A1 | * | 6/2002 | Sull et al. .................. 707/501.1 |
| 2002/0129015 | A1 | * | 9/2002 | Caudill et al. ................. 707/6 |

OTHER PUBLICATIONS

M. Kurimo, "Fast Latent Semantic Indexing of Spoken Documents by Using Self–Organizing Maps," ICASSP, Jun. 2000.*

* cited by examiner

Primary Examiner—George B. Davis
(74) Attorney, Agent, or Firm—Kris T. Fredrick

(57) ABSTRACT

A system and a method for an automated intelligent information mining includes receiving product-related queries and respective product-related information from various text sources; extracting multiple key-phrases from the product-related information and received queries; generating two or more layers of contextual relation maps by mapping the extracted key-phrases to two-dimensional maps using a self organizing map, and a technique including a combination of Hessian matrix and Perturbation technique to enhance the learning process and to categorize the extracted key-phrases based on a contextual meaning. Further, the technique includes forming word clusters and constructing corresponding key phrase frequency histograms for each of the generated contextual relation maps. The technique then includes generating two or more two-dimensional structured document maps of product and queries from the constructed phrase frequency histograms and the generated self-organizing maps using the combination of the Hessian matrix and the Perturbation technique. Then the technique includes selecting answers to the received queries based on masking the generated product and queries related two-dimensional structured maps, respectively.

31 Claims, 2 Drawing Sheets

INDEXING OF KNOWLEDGE BASE IN MULTILAYER SELF-ORGANIZING MAPS WITH HESSIAN AND PERTURBATION INDUCED FAST LEARNING

FIELD OF THE INVENTION

This invention relates generally to the field of information mining, and more particularly pertains to an automated intelligent information mining technique.

BACKGROUND

With the explosive growth of available information sources it has become increasingly necessary for users to utilize information mining techniques to find, extract, filter, and evaluate desired information. Automating such techniques for information mining in text documents can be difficult due to lack of an inherently defined structure and high dimensionality in the available information sources in the text documents. Generally, text documents lack defined structure because text can come from various sources such as a database, e-mail, Internet or through a telephone in different forms. Also, text documents coming from various sources can be highly dimensional (i.e., can contain various types of information that can include more than alphanumeric data such as spatial and temporal data), which can cause disorderliness in the information mining process.

Current information mining techniques such as hierarchical keyword searches, statistical and probabilistic techniques, and summarization using linguistic processing, clustering, and indexing dominate the unstructured text processing arena. The most prominent and successful of the current information mining techniques require huge databases including domain specific keywords, comprehensive domain specific thesauruses, and computationally intensive processing techniques. There has been a trend in the development of information mining techniques to be domain independent, to be adaptive in nature, and to be able to exploit contextual information present in text documents to improve processing speeds of information mining techniques. Current techniques using contextual information present in a text use self-organizing maps (SOMs) to exploit the contextual information present in the text. SOMs are the most popular artificial neural network algorithms. SOMs belong to a category of competitive learning networks. SOMs are generally based on unsupervised learning (training without a teacher), and they provide a topology that preserves contextual information of unstructured document by mapping from a high dimensional data (unstructured document) to a two dimensional map (structured document), also called map units. Map units, or neurons, usually form a two dimensional grid and hence the mapping from high dimensional space onto a plane. Thus, SOMs serve as a tool to make clusters for analyzing high dimensional data. Word category maps are SOMs that have been organized according to word similarities, measured by the similarity between short contexts of the words. Contextually interrelated words tend to fall into the same or neighboring map nodes. Nodes may thus be viewed as word categories.

Currently, the SOMs including contextual information are formed from average contexts using conditional probability for a word that occurs more than once. This methodology may not be globally applicable across varying text documents, and can suffer from losing the short contextual information. Also, current techniques using SOMs have low learning rates, which can be a major bottleneck in achieving higher processing speeds.

Therefore, there is a need in the art for an intelligent information mining technique that can be domain independent, that is adaptive in nature, that can exploit contextual information present in the text documents, and can have an improved learning rate that does not suffer from losing short contextual information.

SUMMARY OF THE INVENTION

The present invention provides an automated intelligent information mining technique for various types of information mining applications such as data and text mining applications, identification of a signal from a stream of signals, pattern recognition applications, and/or natural language processing applications. The technique includes receiving product-related queries and respective product-related information from various text sources, and extracting key-phrases from the received product-related information and queries, and further transforming each of the extracted key-phrases into a unique numerical representation. The technique further includes generating two or more layers of contextual relation maps by mapping the transformed product and query key-phrases to two-dimensional maps, respectively using a self-organizing map and a combination of Hessian matrix and Perturbation (function approximation of neighborhood) technique for speeding up the learning process. Further, the technique includes forming word clusters and constructing corresponding key phrase frequency histograms for each of the generated contextual relation maps. The technique then includes generating two or more two-dimensional structured document maps of the product and queries respectively from the constructed key phrase frequency maps and the generated contextual maps using the self-organizing map and a combination of the Hessian matrix and the Perturbation technique. Selecting answers to queries is based on masking the generated product- and queries-related, two-dimensional structured document maps.

Other aspects of the invention will be apparent on reading the following detailed description of the invention and viewing the drawings that form a part thereof.

BRIEF DESCRIPTION OF THE DRAWINGS

FIG. 3 is block diagram of forming input and output layer nodes.

FIG. 4 is block diagram of a contextual relation map.

FIG. 5 is a block representation of a word cluster.

FIG. 6 is a block representation of a word cluster histogram.

FIG. 7 is a flow chart representative of query processing by an analyzer.

FIG. 8 is a flow chart representative of query processing by an analyzer

DETAILED DESCRIPTION

This document describes an improved automated information mining technique applicable to various types of information mining applications such as data and text mining applications, identification of a signal from a stream of signals, pattern recognition applications, and/or natural language processing applications.

Figure 1:
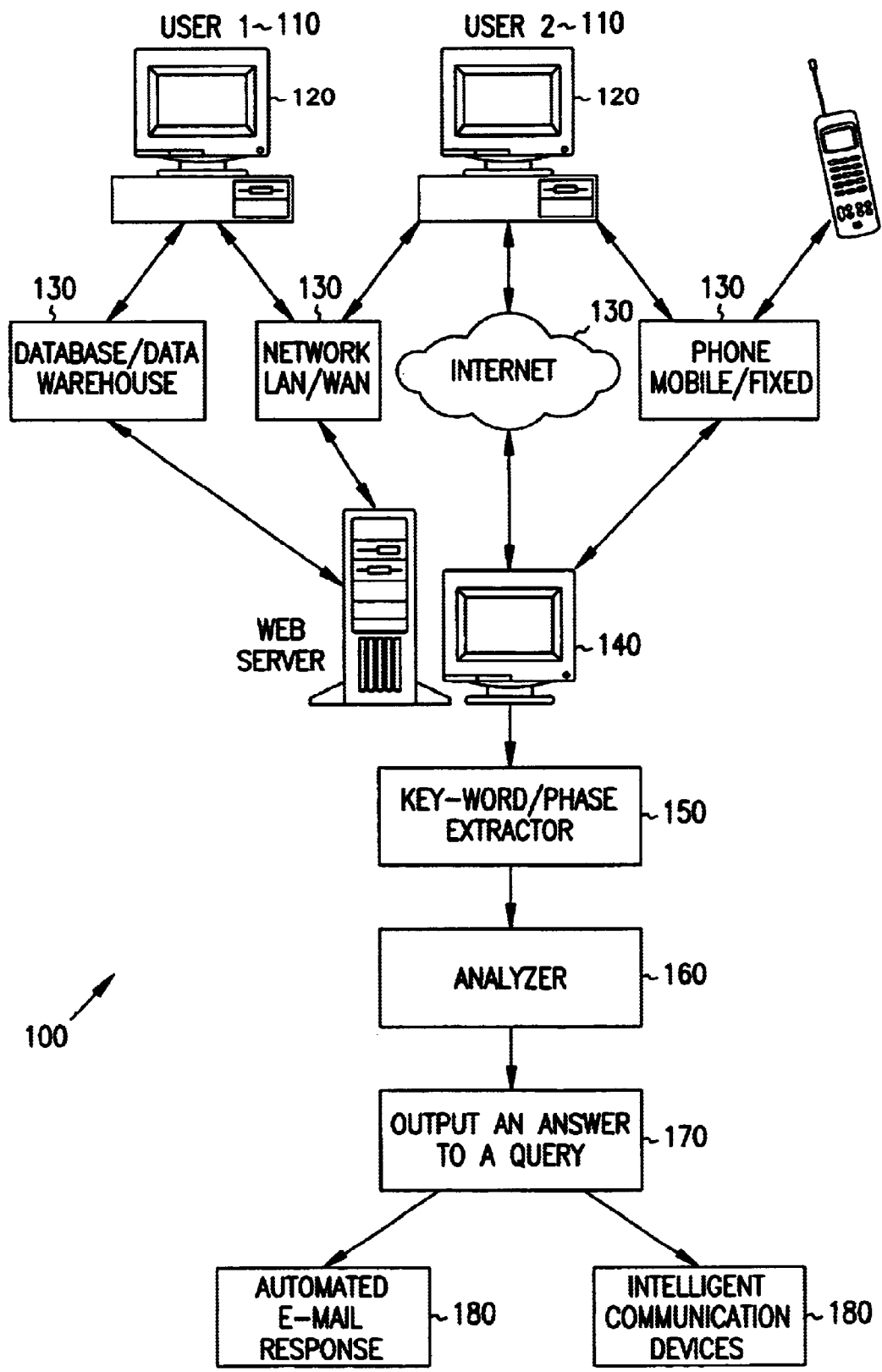
FIG. 1 illustrates an overview of one embodiment of a computer-implemented system according to the present invention.

FIG. 1 illustrates an overview of one embodiment of a computer-implemented system 100 according to the present invention. A web server 140 is connected to receive product-related queries and corresponding product-related information in the form of text from various unstructured sources 130. For example, the web server 140 can receive product queries and product information from the unstructured text sources such as a data base/data warehouse, a LAN/WAN network, SAN (Storage Area Networks) Internet, a voice recognition system, and/or a telephone. The computer-implemented system 100 allows users and/or visitors 110 to send the queries in the form of text via the various sources 130, such as the data warehouse, the LAN/WAN Network, SAN, the Internet, and/or the voice recognition systems via their computers 120. In some embodiments, the unstructured text can be product-related text that can come from sources such as product manuals, maintenance manuals, and/or answers to frequently asked questions (FAQs). The text can be in any natural language.

The computer-implemented system 100 can include a key-word/phrase extractor 150. The key-word/phrase extractor 150 is connected to the web server 140 and extracts multiple product-related information and query key-phrases from the received text. In some embodiments, the key-word/phrase extractor 150 can also extract multiple key-words from the received text and can form the multiple key-phrases from the extracted key-words. In some embodiments, the key-word/phrase extractor 150 extracts key-words from the received text based on specific criteria such as filtering to remove all words comprising three or fewer letters, filtering to remove general words, and/or filtering to remove rarely used words. The formed key-phrases can include one or more extracted key words and any associated preceding and succeeding (following) words adjacent to the extracted key words to include contextual information. In some embodiments, the key-word/phrase extractor 150 extracts product-related information and query key words from the received product-related text. In some embodiments, the key-word/phrase extractor 150 can further morphologize the extracted key-words based on fundamental characteristics of the extracted key-words. For example, the key-word/phrase extractor 150 can morphologize in such a way that morphed (altered) words' pronunciation or meaning remain in place. In some embodiments, the key-word/phrase extractor 150 can extract multiple query-related key-words/phrases from the received query.

An analyzer 160 is connected to the computer-implemented system 100 transforms each of the extracted product-related information and query key-words, phrases and/or morphed words to a unique numerical representation such that the transformed unique numerical representation does not result in multiple similar numerical representations, to avoid ambiguous prediction of meaning of the translated words in the received text.

The analyzer 160 further generates two or more layers of contextual relation maps by mapping the transformed product and query key-phrases to a two-dimensional map, respectively, using a self-organizing map and a function approximation neighborhood technique (Perturbation) to categorize the extracted key-phrases based on contextual meaning for each of the received text sources. In some embodiments, the two or more layers of contextual relation maps can include product and query-related contextual relation maps. In some embodiments, the analyzer 160 generates the contextual relation maps as illustrated below:

Input patterns (key-phrases) are presented to the self-organizing map (artificial neural network) to increase the learning rate of the network.

$x_1, x_2, \ldots x_n \in R^n$ where $x_1, x_2, \ldots x_n$ are triplets (normalized unique representations of key phrases including preceding word, reference key word, and succeeding word) in the 'n' dimensional (text domain is finite and real) real space. For example, if the web server 140 receives the following text:

"Template elucidated the organization process of a product/project."

The key word/phrase extractor 150 can extract following key words from the above-received text:

Template, elucidated, organization, process, and project. Then the key word/phrase extractor forms key phrases by using the preceding word, reference key word, and succeeding word as follows:

the organization process elucidated the organization

Then the analyzer 160 transforms the extracted key-phrases to unique numerical representations. In some embodiments, the analyzer 160 normalizes the unique numerical representations between 0 and 1 as follows

| - | <1.000000 | 0.940188 | 0.681475> |
|---|---|---|---|
| - | <0.5000000 | 1.000001 | 0.940188> |

Then the analyzer 160 initializes random weights using a random number generator and normalizes between 0 and 1 (because the inputs to the network are also normalized between 0 and 1). The strength between input and output layer nodes are referred to as weights, and updating of weights is generally called learning.

$w_i = [w_{i1}, w_{i2}, \ldots, w_{in}]^T \in R^n$, where $w_{i1}, w_{i2}, \ldots, w_{in}$ are the random weights, where 'n' is a dimension of the input layer. Generally, 'n' is based on the number of input patterns/vectors (key-phrases). In the following example of assigned random weights, dimension 'n' is initialized using 10.

0.24, 0.98, 0.47, . . . , 0.25, 0.94, 0.62

Then, parameters of the weight are considered for perturbation as follows:

$$W(t+1) = f(n, m, \delta r(t), \delta c(t))$$

where m is a dimension of the output layer, and $\delta r(t)$ & $\delta c(t)$ are the row and column confidence sizes. This will define the initial neighborhood size of the network to position the key-words/phrases in the two-dimensional contextual map.

Compute distance to all nodes using modality vectors as follows:

$$d_i = \|x - w_i\| \ \forall i:1 \text{ to } n. \ 0.6239, 0.81, 0.04 \ldots$$

Determine the winner among all the nodes $$\|x - w_c\| = \min\{d_j\} \quad \forall j:1 \text{ to } m$$
$$= 0.04.$$

if the number of iterations are multiples of 10 (say 20), then go to step (2) else go to step (1)

Update the value of the weight vector of the winner and neighborhood $$w_i(t+1) = w_i(t) + g(t) \|[x(t) - w_i(t)]\| \qquad (1)$$

Where g(t): is a smoothing kernel function (gain Function) and it varies between 0.3 and 0.7

$$g(t) = \alpha(t)\exp\left(\frac{\|r_c - r_i\|^2}{2(w_i(t))^2}\right)$$

where

α(t): is a learning rate and has been updated from the Hessian matrix $r_c$: is the modality vector of the winner node $r_i > |r_c|$ ∀ $r_i$ within $r_c$ vicinity $r_c$ is 0.04

FIG. 3 illustrates, using the above-illustrated example, the formation of the input and output layer nodes, also referred to as weights (connection strength between a current layer and a subsequent layer is called weight), and updating, which is generally referred to as learning.

In some embodiments, the analyzer 160 further enhances the learning rate of the network by using a Hessian matrix as follows:

Computation of the Gradient G[i]of the Previous iteration error with respect to weight space is given by $$G[i] = \sum_{j=0}^{2n} w[j,k]^* d[i,k],$$

for i=1 to 2n*1 and k=1 to 1, where 1 is number of attributes.

Compute second order derivative using first order gradient with respect to weight space.

The second order derivatives are the diagonal elements of the Hessian matrix H[i,k,]

$$H[i,k] = \sum_{k=1}^{2n} \sum_{j=1}^{l^2} G[k]^* w[i,j] \text{ for } k = 1 \text{ to } 2n$$

$$= 8.8, 9.1, 3.09, \ldots 9.46, 7.25, 7.46$$

Learning rate α(t)=min{H[i,k]; ∀ i=k}

=min{$H_{11}$, $H_{22}$, . . . $H_{kk}$}

={0.871, 0.900, 0.30, . . . 0.9366, 0.7178, 0.7386}=0.30

Then the analyzer 160 further considers the parameters for weight perturbation as follows:

$$w(t^1+1) = f(n, m, \delta r(t^1), \delta c(t^1)) \qquad (2)$$

where n: is the dimension of the input layer m: dimension of the output layer $\delta r(t^1)$ & $\delta c(t^1)$: are the row and column confidence $t^1$:>t computation of δr & δc computation of δr (horizontal direction)

then $\delta_r(t+1) = \delta r(t) - 1$ computation of δc (vertical direction)

$$\delta c(t+1) = \delta c(t) - 1$$

if δc>0||$\delta_r$>0

Then the analyzer 160 forms phrase clusters for each of the generated contextual relation maps. In some embodiments, the analyzer 160 forms the clusters based on positions obtained from the above-illustrated equations using the least square error algorithm.

The analyzer 160 further constructs a key-phrase frequency histogram consisting of frequency of occurrences of product-related key-phrases using the generated contextual relation maps. In some embodiments, the key-phrase frequency histogram is constructed by determining the number of times each of the key-phrases appear, in each of the generated contextual relation maps.

The analyzer 160 further generates two or more two-dimensional structured document maps of the product and queries from the constructed phrase frequency histogram and the generated contextual relation maps using the self-organizing map and the Perturbation technique, respectively, so that each of the generated two-dimensional structured document maps include phrase clusters based on similarity relationship between the formed word clusters. In some embodiments, the two or more two-dimensional structured document maps can include product and query-related two-dimensional structured document maps.

The analyzer 160 then selects an answer to a received query based on masking the generated two or more two-dimensional structured maps. In some embodiments, the analyzer 160 selects an answer to a received product query by masking the generated product-related two-dimensional structured document maps.

The computer-implemented system 100 of the present invention includes various modules as described above, which can be implemented either in hardware or as one or more sequence steps carried out in a microprocessor, a microcontroller, or in an Application Specific Integrated Circuit (ASIC). It is understood that the various modules of the computer-implemented system 100 need not be separately embodied, but may be combined or otherwise implemented differently, such as in software and/or firmware.

The following example embodiment further illustrates the process of the information mining technique employed by the present invention using product-related text information received from various sources 130 by the computer-implemented system 100:

From Text Source—1

"Most web sites today, provide static information about products and services. Lately organizations have begun to realize the potential of the web in changing the way of conducting their business, and interactivity of the web site is very important. It becomes very convenient for customers to search for existing products and services, there by saving precious time and effort. Deliver the infinite number of view search download knowledge base repositories, FAQ's, white papers, patches etc. to provide ready answers to customers about products. Browse and search for solutions through FAQ design input forms allowing customers to submit feedback."

From Text Source—2

"Template elucidates the organization process of a Product/project.

If you are unable to access proACT from other machines then, on the server, open IIS and edit the IP configuration. Right click on the Default Web site' button and configure the machine IP address. This has to be done by the Web server administrator."

From Text Source—3

"Layout for all screens of Honeywell ProACT 3.0. Labels for each field. (Field Name refers to the name of the field as stored in the database and Label refers to the field name as displayed on all user entry screens. Some fields retain their Field Names to maintain functionality. The labels of the field names can be changed without affecting the functionality. Visibility and mandatory properties of each field. Attributes of the field (If the type of field is multi-select). Every time you wish to track Entries for a Product/Project, it has to be associated to a Template. A default Template called Default Template is provided along with Honeywell ProACT. Template in the Tool Administration navigation frame is used to Add, Edit or Delete a Template."Then the analyzer 160 using the key-word/phrase extractor 150 extracts key-phrases and generates a contextual relation map from the above received product-related text as illustrated in FIG. 4.

Generally, the average number of words that are being mapped into a single map node influences the decision on the size of the contextual map. In general, the average number of words would be around 4 to 5 words per node. In the above-illustrated example, the contextual relation map has 10×25 nodes. Then the analyzer 160 forms a word cluster as shown in FIG. 5, and a word cluster histogram as shown in FIG. 6.

Then the analyzer 160 generates the following two-dimensional structured map using the above generated contextual relation map and the constructed word cluster histogram as shown in FIG. 7.

At this point, the computer-implemented system 100 can receive a query from a user 110. The following example illustrates using a product-related query that comes from a user 110 to the computer-implemented system 100 of the present invention. When the product-related query comes to the computer-implemented system 100, the analyzer 160 repeats the above steps as shown in the diagram of FIG. 8.

Then the analyzer 160 masks the generated product-related two-dimensional structured document map over the generated query-related two-dimensional document map to determine an answer to the query received. In the above-illustrated example, the answer to the query comes from the answer at row and column locations 9 and 8 in the product-related two-dimensional structured map.

Figure 2:
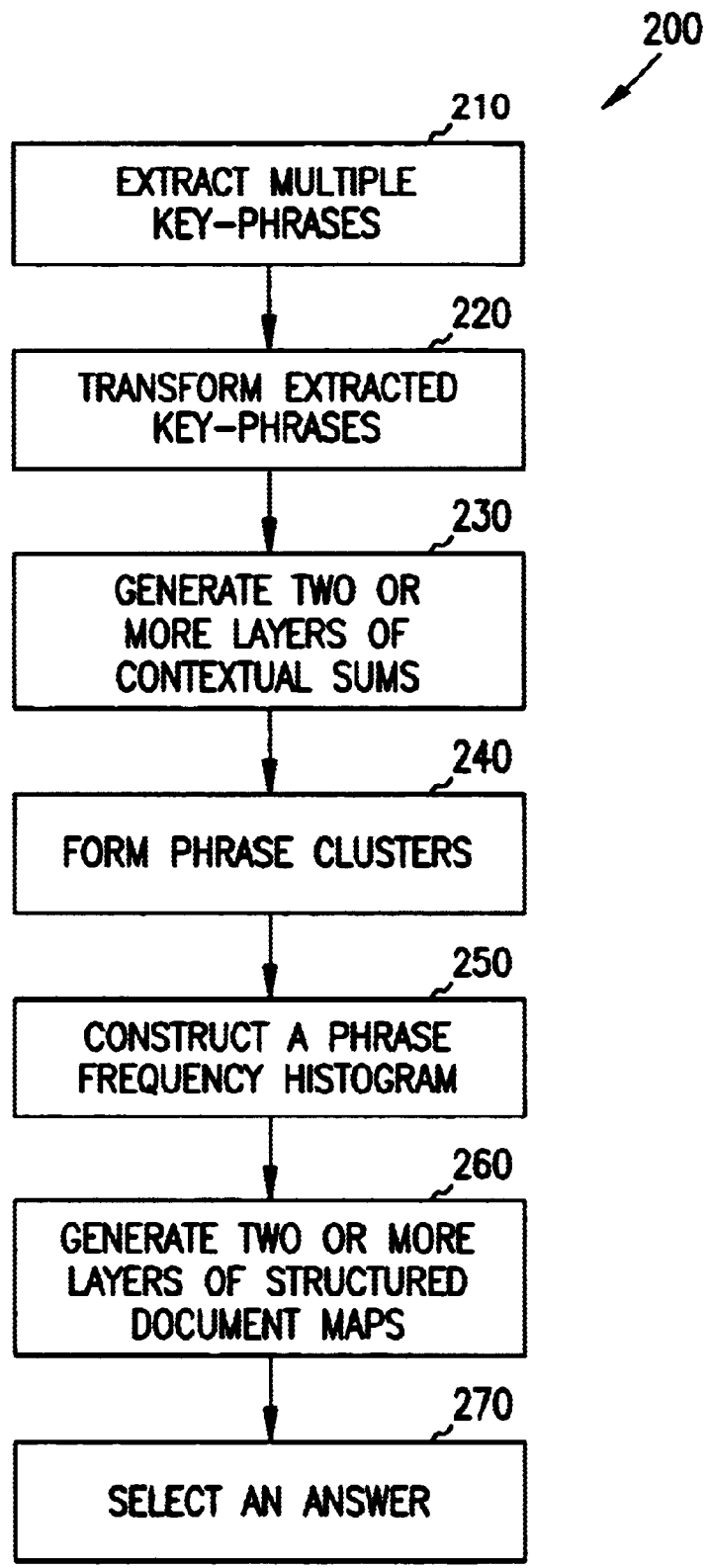
FIG. 2 illustrates overall operation of the embodiment shown in FIG. 1.

FIG. 2 illustrates an overview of one embodiment of the process 200 of the present invention. This process 200 provides, among other elements, as illustrated in element 210, a computer-implemented system including a web server. The web server receives unstructured text from various sources such as a data base/data warehouse, a LAN/WAN network, SAN, Internet, a voice recognition system, and/or a mobile/fixed phone. Further, the element 210 extracts multiple key-phrases from the received text. In some embodiments, element 210 can also extract multiple key-words from the received text and can form the multiple key-phrases from the extracted key-words. In some embodiments, the element 210 extracts key-words from the received text based on a specific criteria such as filtering to remove all words comprised of three or fewer letter, and/or filtering to remove rarely used words. The formed key-phrases can include one or more extracted key-words and any associated preceding and following words adjacent to the extracted key-words to include contextual information. In some embodiments, the element 210 extracts product-related key-words from received product-related text. In some embodiments, the element 210 can further morphologize the extracted key-words based on fundamental characteristics of the extracted key-words. For example, the element 210 can morphologize in such a way that morphed (altered) words' pronunciation or meaning remain in place. In some embodiments, the element 210 can extract multiple query-related key-words/phrases from the received query.

Element 220 transforms each of the extracted key-words, phrases and/or morphed words to a unique numerical representation such that the transformed unique numerical representation does not result in multiple similar numerical representations, to avoid ambiguous prediction of meaning of the translated words in the received text.

Element 230 generates two or more layers of contextual relation maps by mapping the transformed key-phrases to a two-dimensional map using a self-organizing map and a Perturbation technique to categorize the extracted key-phrases based on contextual meaning for each of the received text sources. In some embodiments, the two or more layers of contextual maps can include product and query-related self-organizing maps. In some embodiments, the learning rates of the generated contextual maps are further enhanced by using a Hessian matrix. The process of generating the contextual maps using the Perturbation and Hessian matrix is described in detail with reference to FIG. 1.

Element 240 includes forming phrase clusters for each of the generated contextual relation maps. In some embodiments, the phrase clusters are formed using a least square error algorithm. Element 250 includes constructing a key-phrase frequency histogram consisting of the frequency of occurrences of product-related key-phrases using each of the generated contextual relation maps. In some embodiments, the key-phrase frequency histogram is constructed by determining the number of times each of the key-phrases appear, in the each of the generated contextual relation maps.

Element 260 includes generating two or more two-dimensional structured maps of the product-related information from the constructed phrase frequency histogram and the generated contextual relation maps using the self-organizing map and Perturbation technique, respectively, so that each of the generated two-dimensional structured document maps include phrase clusters based on similarity of relationship between the formed word clusters. In some embodiments, the two or more two-dimensional structured document maps can include product and query-related two-dimensional structured document maps.

Element 270 includes selecting an answer to a received query based on masking the generated two or more two-dimensional structured maps. In some embodiments, the answer to a received product-related query is selected based on masking the generated product and query-related two-dimensional structured document maps, respectively.

CONCLUSION

The above-described computer-implemented technique provides, among other things, a method and apparatus for an intelligent information mining that can be domain independent, that can adapt in nature, that can exploit contextual information present in the text documents, and that can have an improved learning rate without losing contextual information.

What is claimed is:

1. An information mining method, comprising:

receiving product-related queries, and respective product-related information from various unstructured text sources;

extracting multiple key-phrases from the received product information and queries;

transforming each of the extracted key-phrases into a unique numerical representation;

generating two or more layers of contextual relation maps by mapping the transformed product information and query key phrases, respectively, to two-dimensional maps using a self-organizing map and a function approximation neighborhood technique;

forming phrase clusters for each of the generated contextual relation maps;

constructing key phrase frequency histograms consisting of the frequency of occurrences of product related key phrases and query-related key-phrases, respectively, from each of the generated contextual relation maps;

generating two or more two-dimensional structured document maps of the product and queries from each of the corresponding constructed key phrase frequency histograms and the generated contextual relation maps using function approximation neighborhood technique in the self organizing map; and selecting answers to the received queries based on masking the generated product and query two-dimensional structured maps, respectively.

2. The method of claim 1, wherein the various text sources comprise:

text sources selected from the group comprising product manuals, maintenance manuals, and/or answers to frequently asked questions.

3. The method of claim 1, further comprising:

extracting multiple product-related key-words from the unstructured text sources; and forming multiple product-related key-phrases from each of the extracted multiple product-related key-words.

4. The method of claim 3, wherein extracting multiple product-related key-words comprises:

extracting multiple key-words from the unstructured text sources based on specific criteria selected from the group comprising filtering to remove all words comprised of three or fewer letters, filtering to remove general words, and filtering to remove rarely used words.

5. The method of claim 3, wherein the key-phrases comprise:

one or more key-words and/or one or more key-phrases.

6. The method of claim 3, wherein key-phrases comprise:

one or more extracted key-words and associated preceding and following words adjacent to the extracted key-words to include contextual information.

7. The method of claim 1, further comprising:

extracting multiple query-related key-words from the query; and forming multiple query-related key-phrases from each of the extracted multiple product-related key-words.

8. The method of claim 1, wherein the two or more layers of contextual relation maps are further generated using a Hessian matrix to further enhance the learning rate of the contextual relation maps.

9. The method of claim 1, wherein receiving the product-related information comprises:

receiving the product-related information from sources selected from the group consisting of a data base/data warehouse, a LAN/WAN network, SAN, Internet, a voice recognition system, and a mobile/fixed phone.

10. The method of claim 9, wherein the received information can be in any natural language.

11. The method of claim 1, wherein the query can come from the group consisting of a LAN/WAN network, SAN, Internet, a voice recognition system, and a mobile/fixed phone.

12. An intelligent information mining method, comprising:

receiving product-related queries, and corresponding product-related information from various unstructured text sources;

extracting multiple product-related key-phrases from the received production information;

transforming each of the extracted key-phrases into a unique numerical representation;

generating a first layer product contextual relation map by mapping the transformed product-related key-phrases to a two-dimensional map using a self-organizing map and a function approximation neighborhood technique to categorize each of the transformed product-related key-phrases based on contextual meaning;

forming phrase clusters using the generated product contextual relation map;

constructing a phrase frequency histogram consisting of frequency of occurrences of product-related key-phrases from the generated product contextual relation map;

generating a two-dimensional structured document product map including the product-related information from the constructed phrase frequency histogram and the generated product contextual relation map using the self-organizing map and the function approximation neighborhood technique so that the generated first two-dimensional structured document map includes text clusters based on similarity of relationship between the formed phrase clusters;

extracting multiple query-related key-phrases from the received product queries;

transforming each of the extracted query-related key-phrases into a unique numerical representation;

generating a query contextual relation map by mapping the transformed query-related key-phrases to a two-dimensional map using the self-organizing map and the function approximation of neighborhood technique to categorize the query-related key-phrases based on contextual meaning;

constructing a query key phrase frequency histogram consisting of frequency of occurrences of query-related key-phrases from the generated query contextual relation map;

generating a two-dimensional structured document query map including the received queries from the constructed query phrase frequency histogram and the generated query contextual relation map which includes clusters of information using the self-organizing map and the function approximation of neighborhood technique such that locations of the information in the clusters determine similarity relationship among the formed clusters; and selecting an answer to a query based on masking the generated two-dimensional structured document query map over the generated two-dimensional structured product document map.

13. The method of claim 12, wherein the various unstructured text sources comprise:

text sources selected from the group comprising product manuals, maintenance manuals, and/or answers to frequently asked questions.

14. The method of claim 12, further comprising:

extracting multiple product-related key-words from the unstructured text sources; and forming multiple product-related key-phrases from each of the extracted multiple product-related key-words.

15. The method of claim 14, wherein extracting multiple product-related key-words comprises:

extracting multiple key-words from the unstructured text sources based on a specific criteria selected from the group comprising, filtering to remove all words comprised of three or fewer letters, and filtering to remove rarely used words.

16. The method of claim 14, wherein the key-phrases can comprise:

one or more key-words and/or one or more key-phrases.

17. The method of claim 14, wherein the key-phrases comprise:

one or more extracted key-words and associated preceding and following words adjacent to the extracted key-words to include contextual information.

18. The method of claim 12, wherein a learning rate, for obtaining each of the product and query contextual relation maps, is further enhanced using Hessian matrix.

19. The method of claim 12, wherein receiving the product-related information comprises:

receiving the product-related information from sources selected from the group consisting of a data base/data warehouse, a LAN/WAN network, SAN, Internet, a voice recognition system, and a phone.

20. The method of claim 19, wherein the received information can be in any natural language.

21. A computer-implemented system for intelligent information mining, comprising:

a web server to receive product-related queries and corresponding product-related information from various unstructured text sources;

a key-word/phrase extractor to extract multiple key-phrases from the received product information and queries; and an analyzer to transform each of extracted key-phrases into a unique numerical representation such that the transformed unique numerical representation does not result in multiple similar numerical representations, to avoid ambiguous prediction of meaning of the translated phrases, wherein the analyzer generates two or more layers of contextual relation maps by mapping the transformed product information and query key-phrases, respectively, to two-dimensional maps using a self-organizing map and a function approximation of neighborhood technique to categorize key-phrases based on contextual meaning for each of the received text sources, wherein the analyzer forms word clusters for each of the generated contextual relation maps, and the analyzer further constructs a key phrase frequency histogram consisting of frequency of occurrence of product and query related key-phrases, respectively from each of the generated contextual relation maps, wherein the analyzer generates two or more two-dimensional structured document maps of the product and queries, respectively from the constructed key phrase frequency histogram and the generated contextual relation maps using the self-organizing map and the function approximation neighborhood technique, and wherein the analyzer further selects answers to received queries based on masking the generated product and queries related two-dimensional structured document maps, respectively.

22. The system of claim 21, wherein the various text sources comprise:

text sources selected from the group comprising product manuals, maintenance manuals, and/or answers to frequently asked questions.

23. The method of claim 21, wherein the analyzer extracts multiple product-related key-words from the received unstructured text sources, and wherein the analyzer forms multiple product-related key-phrases from each of the extracted multiple product-related key-words.

24. The system of claim 23, wherein the analyzer extracts multiple product-related key-words from the unstructured text sources based on specific criteria selected from the group comprising filtering to remove all words comprised of three or fewer letters, and filtering to remove rarely used words.

25. The system of claim 23, wherein the key-phrases comprise:

one or more key-words and/or one or more key-phrases.

26. The system of claim 23, wherein key-phrases comprise:

one or more extracted key-words and associated preceding and following words adjacent to the extracted key-words to include contextual information.

27. The system of claim 21, wherein the analyzer further extracts multiple query-related key-words from the query, and further the analyzer forms multiple query-related key-phrases from each of the extracted multiple product-related key-words.

28. The system of claim 21, wherein the analyzer further uses a Hessian matrix to generate the two or more layers of contextual relation maps to further enhance the learning rate of the contextual relation maps.

29. The system of claim 21, wherein the key-word/phrase extractor receives the product-related information from sources selected from the group consisting of a data base/data warehouse, a SAN network, Internet.

30. The system of claim 29, wherein the key-word/phrase extractor receives the product related queries from sources selected from the group consisting of a data base/data warehouse, a LAN/WAN network, Internet, a voice recognition system, and a mobile/fixed phone.

31. The method of claim 30, wherein the received product information and queries can be in any natural language.

* * * * *